April 16, 1940.　　　　L. H. DONNELL　　　　2,197,568
AIRSHIP
Filed June 3, 1936　　　9 Sheets-Sheet 1

Inventor
LLOYD H. DONNELL
By
Attorney

April 16, 1940.  L. H. DONNELL  2,197,568
AIRSHIP
Filed June 3, 1936  9 Sheets-Sheet 2

Inventor
LLOYD H. DONNELL

April 16, 1940.   L. H. DONNELL   2,197,568
AIRSHIP
Filed June 3, 1936   9 Sheets-Sheet 3

Inventor
LLOYD H. DONNELL

April 16, 1940.  L. H. DONNELL  2,197,568
AIRSHIP
Filed June 3, 1936  9 Sheets-Sheet 5

Inventor
LLOYD H. DONNELL

April 16, 1940.   L. H. DONNELL   2,197,568
AIRSHIP
Filed June 3, 1936   9 Sheets-Sheet 6

Inventor
LLOYD H. DONNELL
By
Attorney

April 16, 1940.  L. H. DONNELL  2,197,568
AIRSHIP
Filed June 3, 1936   9 Sheets-Sheet 7

Inventor
LLOYD H. DONNELL
By
Attorney

Inventor
LLOYD H. DONNELL

Patented Apr. 16, 1940

2,197,568

UNITED STATES PATENT OFFICE 2,197,568

AIRSHIP

Lloyd H. Donnell, Akron, Ohio, assignor to Goodyear-Zeppelin Corporation, Akron, Ohio, a corporation of Delaware Application June 3, 1936, Serial No. 83,301

36 Claims. (Cl. 244—125)

This invention relates to the construction of rigid airships and in particular to airships provided with a metal outer cover which has the function of a structural member to take up shear and bending forces and at the same time that of a gas-tight lifting gas container. There are known metal-covered airships, which are to perform the same functions, but which are only operable when the lifting gas is subjected to pressure to keep the metal cover always in taut condition as in the case of non-rigid airships.

A unique method to accomplish the same results is applied in this invention by keeping the lifting gas under normal conditions at atmospheric pressure only. This type of airship consists of one or more longitudinals similar in construction to the gangways of the conventional airship, and extending from bow to stern, of transverse main frames or main rings, braced by wires to form a bulkhead for supporting a diaphragm which takes the place of an end wall of a gas cell, and of intermediate transverse frames or rings of lighter construction, either with or without wire bracings. The longitudinals disposed approximately equally about the circumference serve as points of attachment for concentrated loads. No intermediate longitudinals need be used. A thin sheet metal cover is stretched over the outside and attached to the main and intermediate rings. Each section of the cover from one ring to the next has the shape of the frustum of a cone. The cover is given an initial tension in the longitudinal direction of about one-half its safe yield strength. This initial tension could be produced by stretching the sheet longitudinally before it is attached to the frame, say with a large number of turnbuckles, or the sheet may be attached to the rings without initial tension, after which certain joints in the longitudinals (say at each main ring), which have been connected only temporarily, are forced apart sufficiently to give the cover the required tension, and then connected permanently; the intermediate rings are not rigidly connected to the longitudinals until after this operation, if at all. The cover should also be given sufficient initial tension in the circumferential direction to eliminate all wrinkles in this direction. It will not be necessary to make any provision for doing this, as stretching the cover in the longitudinal direction will automatically stretch it about .3 as much in the circumferential direction due to Poisson's law.

In this type of airship, all of the metal cover takes part of the longitudinal bending moments, along with the longitudinal members. These longitudinal members should be designed so that they could take these moments alone, but they would still weigh less than the longitudinals in a conventional structure, as more efficient use can be made of material when all the weight is concentrated in a few members. The metal cover also takes all longitudinal shear forces and will have many times the strength required for this purpose. The metal cover can also replace at least part of the gas cells.

The circumferential strength of the metal cover will permit a considerable excess of internal pressure, thus eliminating some of the present necessity for valving off gas and under-inflation at the start of a trip and the attendant disadvantages of loss of capacity, reduction in longitudinal stability, etc. At the same time no excess of internal pressure is necessary for full structural strength, as in known types of metal-covered airships.

An excess of external pressure is resisted by the metal cover, chiefly by "catenary" action of longitudinal elements of the cover stretched from one ring to the next (just as such pressures are resisted in the conventional-type by the catenary action of circumferential elements of the fabric cover stretched from one longitudinal to the next). Due to the enormously greater initial tension of the metal cover, such external pressure will cause only a small fraction of the deflections which they produce in the fabric cover of the conventional type.

Difficulties in attaching and constructing the metal cover can be greatly reduced, for instance in the following manner: each conical portion of the cover between rings is a developable surface having the developed shape of a long curved strip. It can be put together on a flat table on the ground. This table need be only as long as the width of the strip (the greatest distance between the rings in the ship). The cover is put together on this table, starting at one end of the strip and working towards the other end, the strip being rolled upon an adjustable conical drum as it is completed. When completed, the strip can be handled on the drum while it is being attached, the drum being taken to the shop, and rolled around the ship as successive portions of the strip are fastened in place. To facilitate handling and attachment to the ship, a narrow piece of heavier sheet can be attached along the edges of the strip while it is being made on the table. This heavier sheet is attached to the rings (and forms part of the rings thereafter, so that its weight is not wasted).

It is justifiable to expect that the proposed airship will combine advantages of known types of airships, while avoiding some of their disadvantages.

A further improvement of the hull structure is the application of a torsionless main frame, consisting of a ring framework braced by a radial or any other wiring system, which, when exposed to one-sided gas-pressure, will allow the main frame to deflect out of its plane without causing torsional forces in same.

Another object of this invention is the provision of an axial resilient element in the main frame bulkhead which permits the bulkhead to expand uniformly from its center and to bulge out from its plane in order to protect the main frame against undue stresses.

A further object of this invention is the application of permanent wire bracings in the intermediate transverse frames, without dividing the gas space between two main frames in separate gas chambers.

For a better understanding of these and other objects of this invention reference is had to the following specification and the accompanying drawings, of which.

Figures 1, 2, 3, 4:
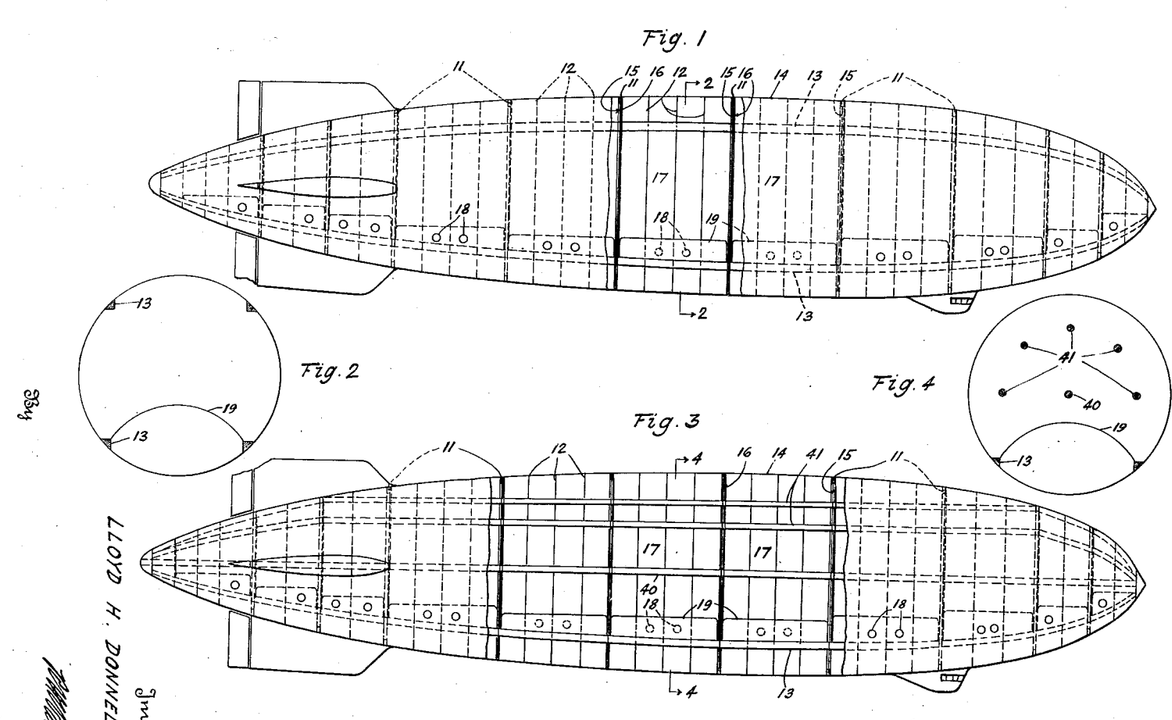
Fig. 1 is a longitudinal elevational view of a metal-clad rigid airship with parts broken away, having four longitudinal keels along the inner surface of the sheet metal covering, a portion of the covering being broken away.
Fig. 2 is a cross-sectional view along the line 2—2 in Fig. 1.
Fig. 3 is a longitudinal elevational view of an airship similar to that of Fig. 1, but with a different arrangement of the longitudinals, a portion of the outer cover being broken away.
Fig. 4 is a cross-sectional view along the line 4—4 in Fig. 3.

According to this invention the metal-covered airship illustrated in Figs. 1 and 2 consists mainly of wire-braced main frames 11, intermediate frames 12, longitudinal members 13, and metal cover 14. The main frames, stiffened by wire bulkheads 15 divide the whole gas space inside the metal cover 14 into a number of smaller compartments or bays. Gas-tight bulkheads 16, one or two per main frame, constructed of metal or any suitable gas-tight textile material, are connected at the outer circumference either to the structure of the main frame 11 or to the metal skin 14 next to the main frames in any absolute gas-tight manner and provide complete gas-tightness of the bays 17. One or more automatic over-pressure safety valves 18 for each bay control the maximum allowable inside super pressure. The number of valves per bay depends on the size of the valves, on the capacity of the bay and on the rate of climb of the ship required. Each bay is equipped in its lower part with one or more diaphragms 19, preferably made of gas-tight fabric. These diaphragms are connected to the gas-tight bulkheads 16 of the particular bay in which it is arranged and to the lower longitudinal members 13, or to the metal cover along these longitudinals in any gas-tight manner and adapt themselves to the change in fullness of the gas compartments at various flying conditions. The metal cover 14, together with the bulkhead walls 16 and the diaphragms 19 form the gas-tight chambers for the lifting gas stored in the different bays. To avoid super or under pressure inside the airship hull the outside of the diaphragm is, of course, in communication with the atmosphere.

The wire-braced main frames 11, which provide the ship's structure with the required stiffness, together with the unbraced intermediate frames 12, serving mainly as supports for the metal skin 14, are securely connected to the latter during erection of the airship. The longitudinal member 13, put under proper compression by specially designed expansion joints, applying the required tension to the metal cover 14, cannot be securely connected to the transverse frames unless the cover is properly tensioned, so as to be capable of withstanding bending forces. The number of longitudinal members required and their size, depending on the proper application of the necessary skin tension, may be one or more.

Examples of how the expansion joints can be applied to the longitudinals are shown by the Figs. 21 to 26. The keel frame work indicated generally by reference character 30 comprises three triangular girders 31, struts 32 and brace wires 33. Each girder 31 may be provided either with a single central adjusting screw 34 engaging the thread of the brackets 35 (see Figs. 23 and 24) located at the center of each girder 31 or adjusting screws such as 36 may engage the threaded brackets 37 (see Figs. 25 and 26) provided outside on each side of the girder 31. After the metal cover 14 has received the proper tension by tensioning screws 34 and 36, the gap between the longitudinals can be overbridged by suitable structural material 38 (see Fig. 21) and then the expansion joints can be removed in order to save weight, or the expansion joints are simply left as they are.

A modification of the airship construction described above is shown in Figs. 3 and 4. In this case, one longitudinal compression member 40 is arranged at the center of the ship and several more longitudinal members 41 are disposed between center and metal skin. This permits most of the differences in gas pressure in adjacent cells to be resisted directly by the longitudinals. The location of the longitudinals 13, usually carrying the service loads, in the lower part of the ship is, for practical reasons, the same as shown in Fig. 1. Except for the difference in the arrangement of the upper longitudinals the construction is the same as that shown in Fig. 1.

Figures 5, 6, 7, 8:
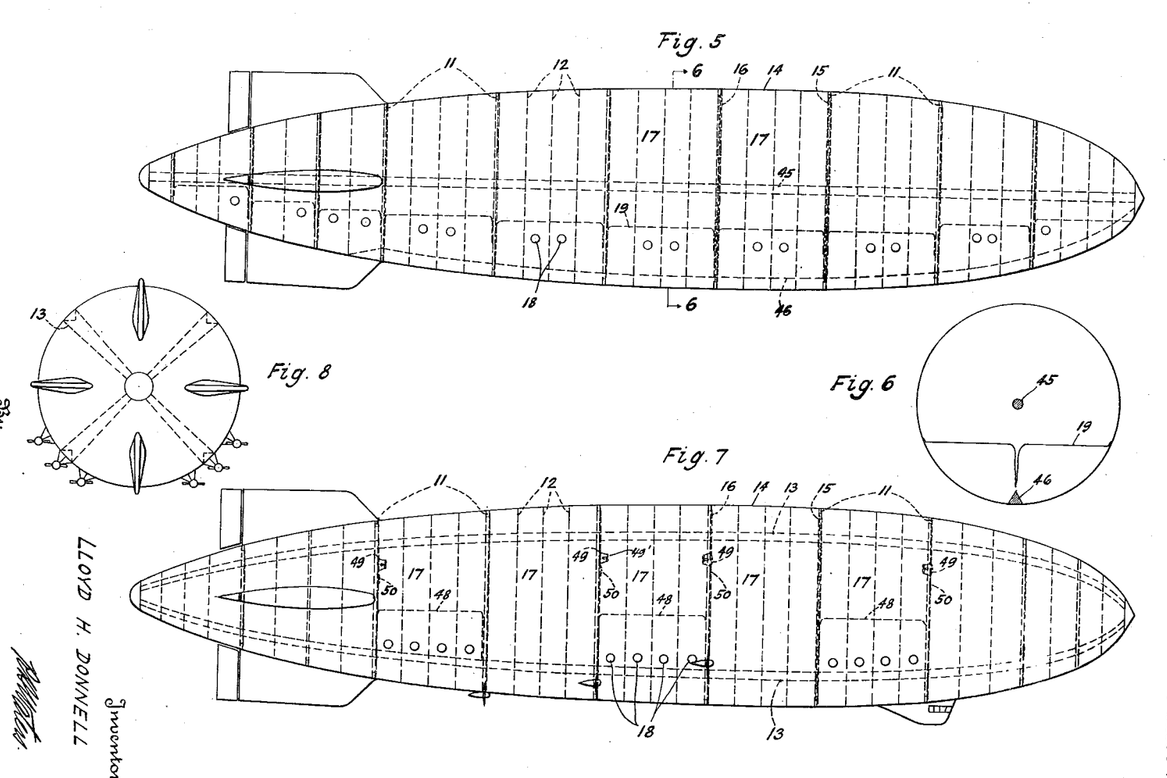
Fig. 5 is a longitudinal view of a metal-clad airship having a bottom keel and a longitudinal in the center of the hull.
Fig. 6 is a cross-sectional view along the lines 6—6 in Fig. 5.
Fig. 7 is a longitudinal view of a metal-clad airship having the same hull structure as that shown in Fig. 1, but with a different gas-cell arrangement.
Fig. 8 is an end view looking from the left in Fig. 7.

Another modification of the airship structure illustrated in Figs. 1 and 2 is shown in Figs. 5 and 6, which is provided with a single longitudinal expansion member 45 in the center of the hull structure. One or more other longitudinal members are also employed in the shape of keel girders 46 as communication gangways and as storage space for the service loads to be carried on board the ship. Otherwise, the main frames, intermediate frames, bulkheads, valves and diaphragms are of the same construction as those shown in Figs. 1 and 2.

A further modification of the airship construction illustrated in Figs. 1 and 2 is shown in the Figures 7 and 8. The structure of this ship is identical with that illustrated in Fig. 1, except for the number of diaphragms installed in the lower part of the bays. Only part of the bays 17 are equipped with diaphragms 48 as shown in Fig. 7. It is assumed that the bays 17 without a diaphragm 48 are fully inflated at any time the ship is filled with lifting gas. The gas chamber 17 of the bays with a diaphragm serves as a nursing balloon for the bays without a diaphragm. Any ill effect upon the fullness of the bays without a diaphragm due to change in temperature, barometric pressure or loss of gas, is counterbalanced by overflowing gas, either from the bays without diaphragm to the bays with a diaphragm or vice versa, by means of valves 49 and 50 located in the bulkhead walls. The valve 49 opens from the bay with a diaphragm into a bay without a diaphragm and valve 50 in opposite direction. The bay without a diaphragm is always kept fully inflated by means of an electric fan 49' feeding gas through valve 49. The electric fan may be switched on or off either by hand or automatically at certain gas pressures in the full gas cell. As soon as the pressure in such a bay begins to rise above a certain limit, valve 50 will open automatically to release gas to the bay containing the diaphragm. A good solution seems to be an arrangement with half the bays carrying diaphragms 48. The employment of a reduced number of diaphragms has the advantage of saving weight.

Figure 27:
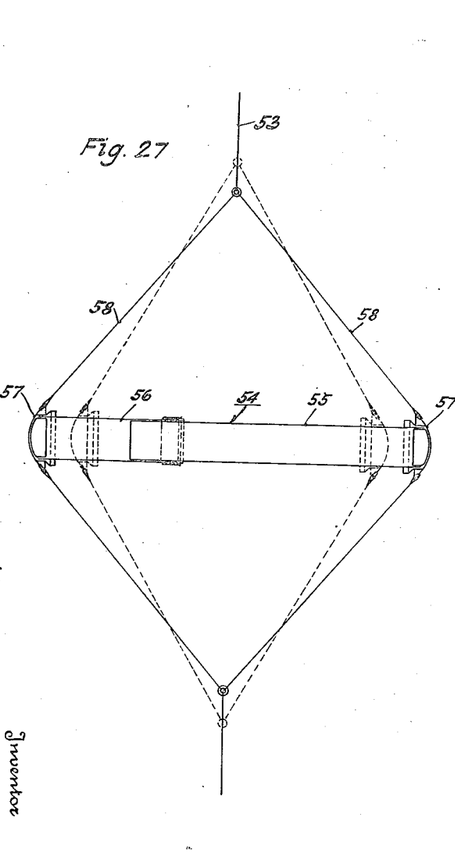
Fig. 27 is a longitudinal sectional view through the center portion of a main frame bulkhead provided with a resiliency device.
Figure 28:
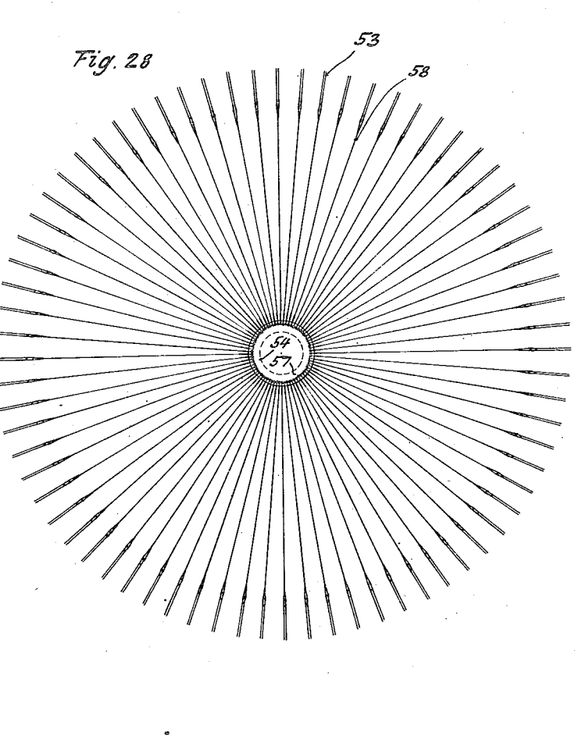
Fig. 28 is a side view of Fig. 27.

In Figures 9 to 14 is illustrated, in larger scale, a typical bay construction of a metal-covered airship. The main frame 11, in this case, made of triangular frame work, is braced by radial wires 53 which form the bulkhead 15 for supporting the gas pressure. Instead of radial wires, of course, any other arrangement could be chosen for the design. The intermediate frame 12 is of similar construction as the main frame, but is of smaller cross section and has no wire bracing. The wire bulkhead 15 of the main frame 11 is provided in the center with a resiliency device 54, shown in larger scale in the Figs. 26 and 27. This device consists of two telescoping cylinders 55 and 56, having a seal between same to prevent escape of the air therein, which are held in horizontal and concentric position between two cup-shaped elements 57, to each of which a spider 58, connected to the radial bracing wires 53, is attached. In case the bulkhead is exposed to one-sided gas pressure, the wires are put under greater tension and force the cylinders 55 and 56 together, thereby expanding and bulging the bulkhead out. This expansion prevents undue compression forces in the frame structure. Owing to the particular arrangement of the resiliency device, all bulkhead wires are tensioned uniformly and, therefore, the additional forces set up in the structure are likewise uniform. That is a great advantage over conditions in previous arrangements of resiliency devices for such purpose.

Figures 9, 10, 11, 12:
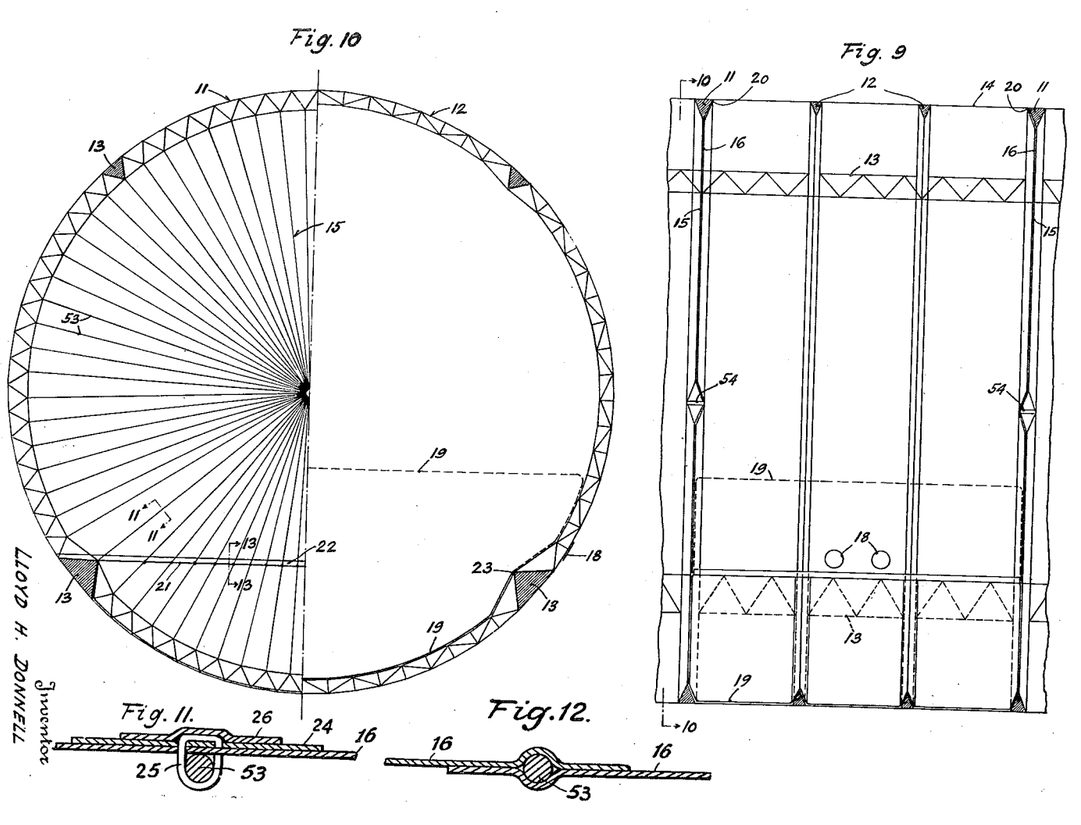
Fig. 9 is a longitudinal section of a gas cell bay showing the gas cell arrangement.
Fig. 10, left-half, is a cross-sectional view along the line 10—10 in Fig. 9, showing the bulkhead of the main ring; and the right half of Fig. 10 is a cross-sectional view illustrating the construction of an unbraced intermediate ring.
Fig. 11 is a cross section through a radial wire of the bulkhead along the line 11—11 in Fig. 10 showing the attachment of the gas partition wall to the bulkhead.
Fig. 12 is a section taken at the same place but being a modification of the former.

The gas volume contained between two main frames is surrounded circumferentially to the greatest part by the gas-tight metal cover 14 and the remaining part by the diaphragm 19. Metal, or preferably gas-tight fabric walls 16, cover the wire bulkheads and are secured in a gas-tight manner at the corner 20 to the main frame or directly to the outer metal cover (Fig. 9). Instead of covering the wire bulkheads entirely with a gas-tight wall, the wall may advantageously extend at the bottom only to a wire 21, which is stretched between the lower longitudinal keel girders 13 and is soldered or otherwise fastened at its intersections to the radial bulkhead wires 53. The bulkhead walls 16 are securely sewed, laced or cemented to the wires 21 and, above this fastening, the transverse diaphragm walls are cemented gas-tight to the bulkhead walls at 22. The longitudinal edges of the diaphragm 19 are attached along the apex 23 of the lower keel girders 13, which are made gas-tight on the top side, thus enclosing a completely gas-tight chamber between two main rings.

In Fig. 11 the bulkhead wall 16, preferably made of gas-tight fabric of standard width, is reenforced by strips 24 opposite the radial wires 53 and stitched with thread 25 to these wires. A cover strip 26 is cemented over the stitching on top of the reenforcing strip to insure gas-tightness.

In the modification shown in Fig. 12, the bulkhead wall is made up of segments substantially extending between adjacent radial wires. Adjacent segments are disposed at opposite sides of the bulkhead wires and overlap each other, thus enclosing the wires. Each overlapping portion is cemented to the adjacent segment and to the enclosed wire.

Figures 13, 14, 19, 20:
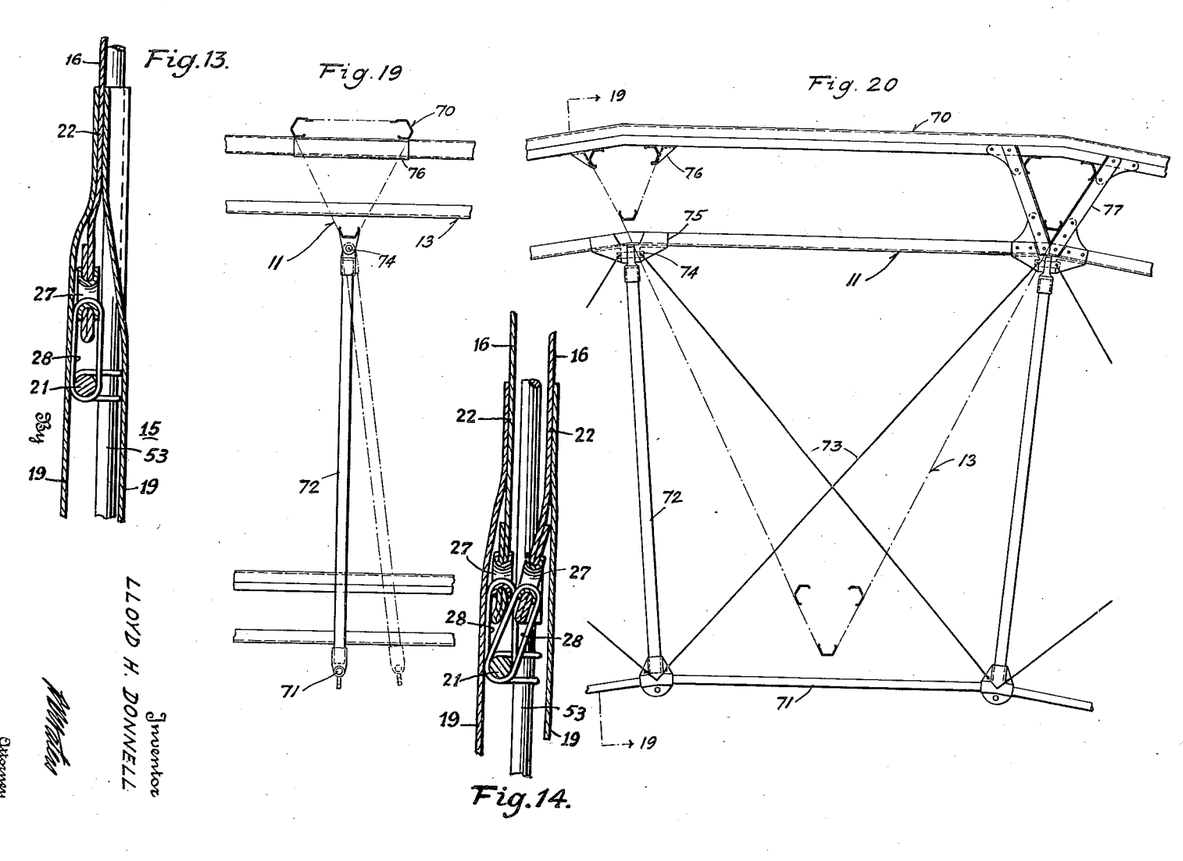
Fig. 13 is a section through the attachment of the single gas cell end wall with the lower diaphragm, taken along the line 13—13 of Fig. 10.
Fig. 14 is a section taken at the same place but with the modification that the lower diaphragm of each gas compartment is attached to separate gas-cell end-walls.
Fig. 19 is an enlarged cross-sectional view of a torsionless main ring.
Fig. 20 is a fragmentary side view of Fig. 19.

Figs. 13 and 14 show the attachment of the fabric bulkhead 16 to the wire 21, and also its gas-tight connection with the diaphragm 19. Fig. 13 refers to a single fabric bulkhead and Fig. 14 to a double one. The fabric bulkhead is provided at its bottom edge with eyelets 27 through which it is laced by a cord 28 to the cross wire 21. The diaphragms 19 are cemented at 22 to the bulkhead wall at opposite sides.

In Fig. 14, two fabric bulkheads 16 are provided, one at each side of the wire bulkhead 15. Both fabric bulkheads are laced to the cross wire 21 and above the lacing each of the diaphragms is cemented to its own bulkhead at 22. Separate bulkhead walls for each gas container have the advantage that they do not have to be fastened to the radial wire bracings since they are always pressed against the wire bulkhead and never away from it. Of course, some more weight is involved in this construction.

Figure 15:
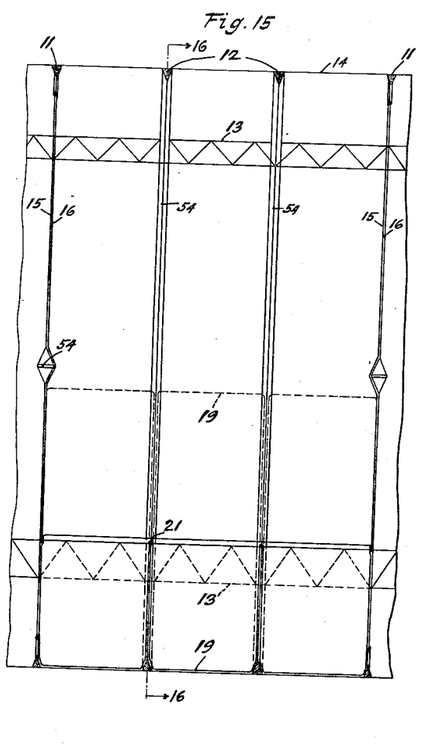
Fig. 15 is a longitudinal section through a gas cell bay showing separate gas-cell diaphragms between the main and intermediate ring.
Figure 16:
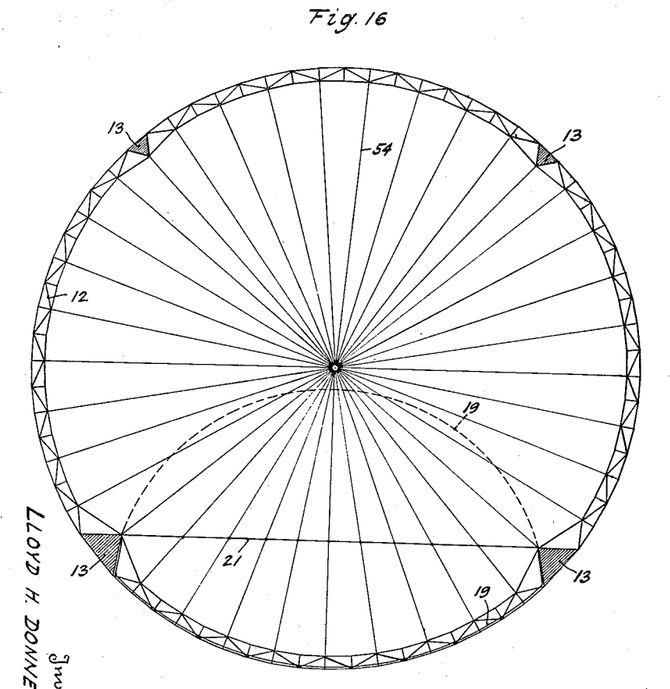
Fig. 16 is a cross-sectional view along the line 16—16, showing the construction of a wire-braced intermediate ring.

In Figs. 15 and 16 is shown a modification of a bay structure in which the main transverse frames 11 are built torsionless according to Figs. 19 and 20. The main frame consists of an outer circumferential girder 70, located adjacent to the metal cover, an inner ring member 71 farther inboard and of a bracing system between the two, such as the struts 72 and wires 73. The struts 72 are hinged to the girders 70 by pins 74 allowing the struts together with the inner member 71 and wire bracing 73 to swing sideways about pins 74 supported by brackets 75 under any side load upon the bulkhead, practically eliminating torsional forces in the outer girders 70. The inner member 71 of this torsionless main frame can be a cable under initial tension, or a girder.

As previously mentioned, all transverse members of the ship's structure, like main and intermediate frames, are already permanently and firmly connected with the metal cover of the ship during erection. Since that cannot be done to any of the longitudinal members of the structure until the metal cover is properly tensioned, a sliding shoe connection 76, as illustrated at the left side of Fig. 20, is employed, which, after tensioning of the cover is replaced by a fixed triangular bracing 77' as shown at the right of Fig. 20. The intermediate frames, contrary to conventional constructions, also are provided with a radial wire bracing system 54 (see Figs. 15–18), which, however, may be of any suitable type. These wire bracings, which make the intermediate rings very rigid, are made of lighter construction than those of the main ring. In Figs. 15 and 16 they require the division of the diaphragm 19 into three separate pieces to permit the diaphragm the necessary movement.

Figure 17:
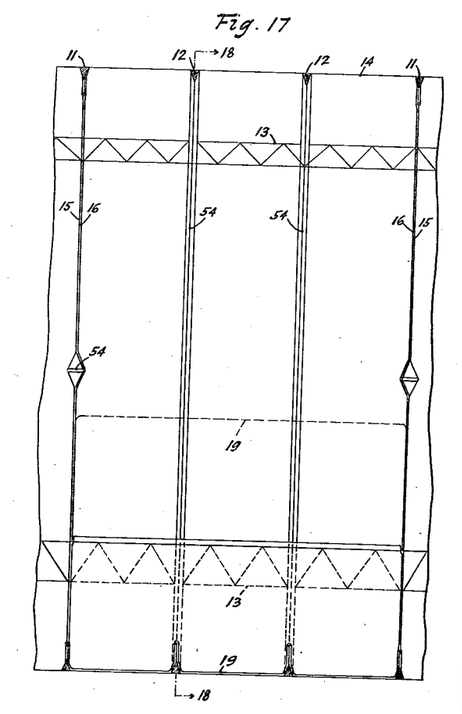
Fig. 17 is a similar section to Fig. 15 but shows a different diaphragm construction.
Figure 18:
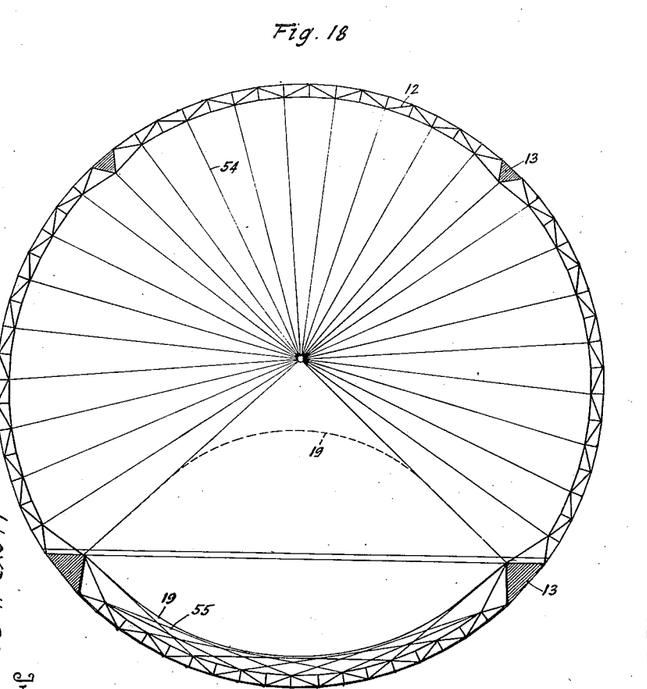
Fig. 18 is a cross-sectional view along the lines 18—18 in Fig. 17, illustrating a modification of the intermediate ring bracing.
Figure 21:
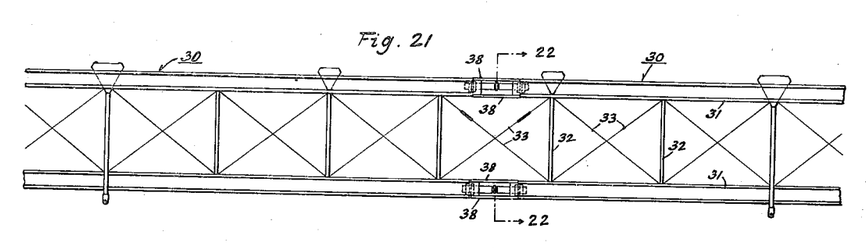
Fig. 21 is a side view of a longitudinal member provided with extension means.
Figure 22:
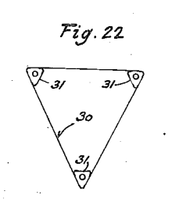
Fig. 22 is a cross-sectional view along the line 22—22 in Fig. 21.
Figure 23:
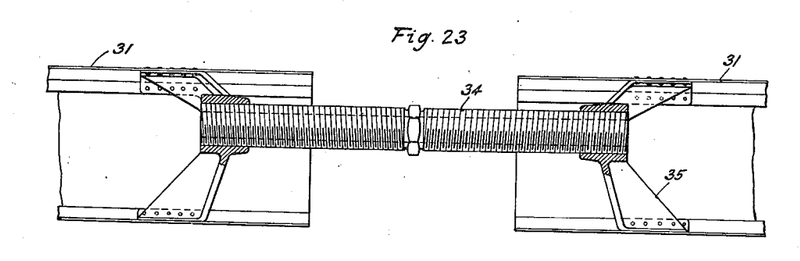
Figs. 23 and 24 show details of an extension screw passing through the center of gravity of a longitudinal girder.
Figure 24:
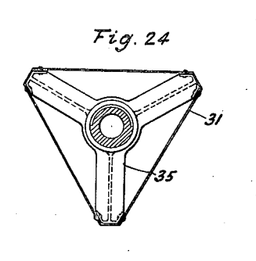
Figure 25:
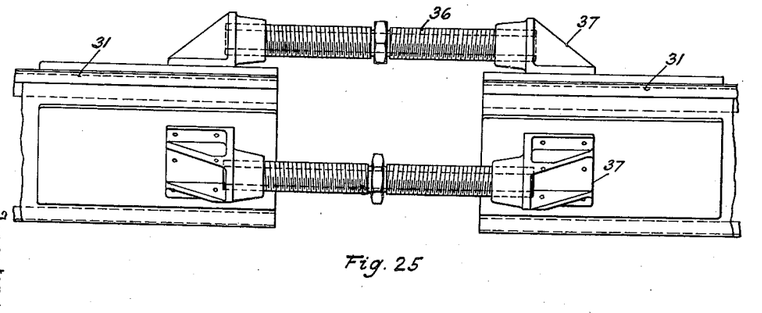
Figs. 25 and 26 show a modification of the construction illustrated in Figs. 23 and 24.
Figure 26:
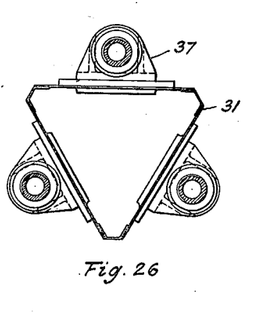

In Figs. 17 and 18, a bay construction similar to that described above is shown, but with the difference that the radial wires 54 in the intermediate frame are omitted between the lower longitudinal keel girders 13, and instead chord wires 55 are provided to brace the lower ring structure. With this construction, the diaphragm 19 can be made in one piece except that circular grooves must be provided in the diaphragm on the circumferential wall thereof to make room for the chord wires 55 in fully inflated condition.

Figure 29:
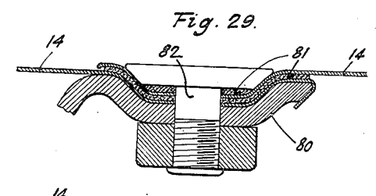
Fig. 29 is a sectional view in enlarged scale showing a screw connection of the metal cover to the transverse frame.
Figure 30:
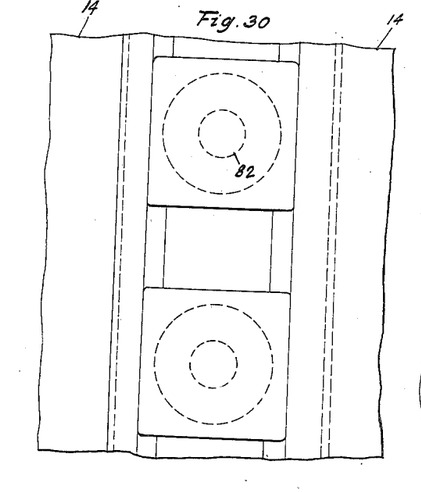
Fig. 30 is a top view of Fig. 29.
Figure 31:
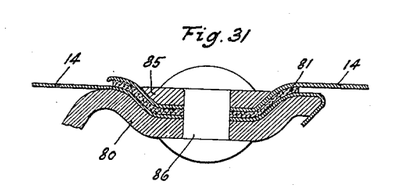
Figs. 31 and 32 are views similar to those shown in Figs. 29 and 30, but for a riveted seam.
Figure 32:
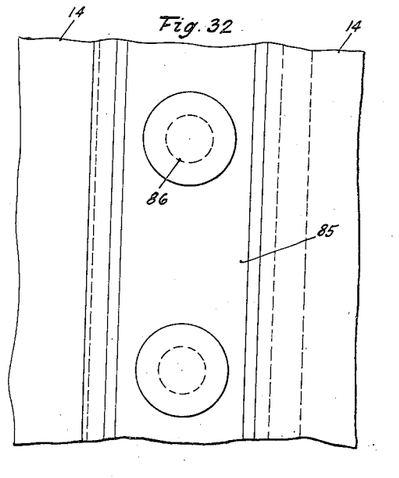
Figure 34:
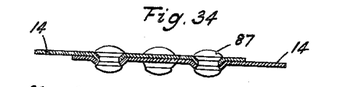
Fig. 34 is a section through a typical rivet joint of the outer cover.

The methods of fastening the metal cover to the frame work is shown, for instance in the Figures 29 to 34, for aluminum alloy and for steel. Figs. 29 and 30 show a grooved channel 80 of a transverse frame 11 or 12 into which fits the overlapping edges of the metal cover 14 which conform to the shape of the groove. A gas-tight seal 81, made of rubber, fibre, paper, paint, lacquer or paste, is used to secure a tight joint. Bolts 82, with square or round heads substantially flush with the outside of the groove, fasten the cover to the girder. Figs. 31 and 32 show a joint in which a metal strip 85 fills out the groove in the channel and is secured to the girder together with the sheet cover, by rivets 86. Fig. 34 illustrates a standard lap seam of two sheets 14 riveted together by a single or multiple row of rivets 87 with the aid of a sealing means between the sheets. This type of joint can also be used for securing the overlapping ends of a peripheral strip of the metal 41.

Figure 33:
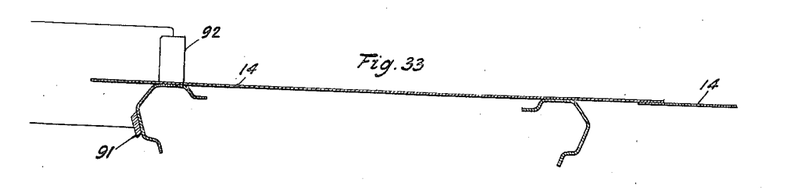
Fig. 33 is a diagrammatic view showing the process of soldering or welding the outer cover to the frame structure.

In case steel, instead of aluminum alloy, is being used for the hull structure, the skin is advantageously applied to the structure by means of soldering or welding. For soldering, the surfaces to be joined are carefully cleaned and covered with a coat of solder before the steel skin is applied. By applying regulated electric current by means of electrodes 91 and 92, in order to localize the heat, the contacting tinned surfaces can be sweated together (Fig. 33). All other lap seams required in assembling the steel cover of the ship can be made in the same manner.

In proceeding with the assemblage of the ship's structure, the transverse main and intermediate frames, which are assembled on the ground, are brought into vertical position at their proper distances relative to each other. One or more longitudinal members are then inserted to fix preliminarily the position of the transverse members. The structure is now ready for the application of the sheet metal covering.

Figure 35:
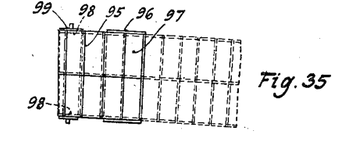
Fig. 35 illustrates the method of building up circumferential sections of the metal cover on the ground.

The best method of making and applying the covering to the airship frame work is to first assemble, as shown in Fig. 35, the single sheets 95 on a working table or bench 96 into larger sections 97. The width of these sections corresponds to the distance between adjacent transverse frames, and their length to the circumference of the frames to which they are attached. If more suitable for application, sections of shorter length may be made. The length of the working table does not need to be much larger than the width of the sections, and, therefore, requires very little space. Preparing the sections on the ground also saves a great deal of the more expensive assembly work above ground. The circumferential edges of the cover sections may be provided with a narrow metal reenforcing strip 98, in order to reduce the number of bolts or fastening means required for securing the cover to the frame work. As the finished covering 97, usually in the curved shape of the development of a frustum, leaves the table 96, it is wound upon a tapered drum 99. The drum, then, is suspended from above the ship's structure and the covering is unwound from the drum and laid around the transverse frames to which it is fastened. After application of the cover, it is tensioned by expanding the longitudinals. Either the cover may be stretched in its full length at one time or only bay for bay, in which latter case the longitudinals may be rigidly attached to the main rings before stretching the cover, whereas the intermediate rings are slidingly connected to the longitudinals and permanently secured to them after the cover has been stretched.

Obviously, many variations can be made of the particular constructions described without departing from the scope and spirit of this invention and therefore I do not wish to limit my invention except as may hereinafter be set forth in the claims hereunto appended.

Having thus described my invention, what I claim and desire to secure by Letters Patent of the United States is:

1. In a rigid airship, a hull structure, a gas-tight metal skin surrounding and conforming to the outer contour of said hull structure to which it is secured, and expansion means in said hull structure for creating tension in the metal skin to make it capable of resisting shear and bending forces at atmospheric gas pressure.

2. In a rigid airship, transverse main frames and intermediate frames, longitudinal members spacing and connecting the main and intermediate frames, a gas-tight metal skin conforming in its contour to the outside diameter of said frames to which it is secured, and expansion means in the longitudinal members for applying tension to the metal skin.

3. In a rigid airship, transverse main frames and intermediate frames, longitudinal members spacing and connecting said main and intermediate frames, expansion devices in said longitudinal members, a gas-tight metal skin surrounding the structural members and conforming in its contour to the outside diameters of said frames to which it is secured, tensioned by means of said expansion devices to make it resistant against shear and bending forces, a bulkhead bracing each main frame, and gas-tight walls, secured to one side of each of the wire bulkheads and at their outer circumference to the metal skin, forming together with the latter a plurality of gas compartments.

4. In a rigid airship, transverse main frames and intermediate frames, longitudinal members spacing and connecting said main and intermediate frames, expansion devices in said longitudinal members, a gas-tight metal skin surrounding the structural members and conforming in its contour to the outside diameters of said frames to which it is secured, tensioned by means of said expansion devices to make it resistant against shear and bending forces, a wire bulkhead bracing each main frame, and gas-tight walls, secured to one side of each of the wire bulkheads and at their outer circumference to the metal skin forming together with the latter a plurality of gas compartments.

5. In a rigid metal-covered airship, transverse main frames and intermediate frames, longitudinal keel girders spacing and connecting said transverse frames, said keel girders being provided with right- and left-hand threaded spindles engaging brackets on said keel girders, a metal skin covering the ship structure and attached to the transverse frames to be expanded by lengthening the keel girders by means of said spindles, to make the metal skin capable of resisting shear and bending forces in the absence of inner pressure.

6. The method of constructing a metal-covered rigid airship consisting substantially of transverse main frames, intermediate frames, longitudinal members provided with expansion devices, and of a gas-tight metal skin, by first locating the transverse members in proper relative position, spacing and fixing said transverse members by the longitudinal members, applying and fastening the metal skin to the transverse members and then expanding the expansion devices of the longitudinal members, thereby stretching the metal skin to make it capable of resisting the shear and bending forces set up in the hull structure.

7. The method of constructing a metal-covered rigid airship consisting substantially of transverse main frames, intermediate frames, longitudinal members provided with expansion devices in each bay and of a gas-tight metal skin, by first locating the transverse members in proper relative position, spacing and fixing said transverse members by the longitudinal members, applying and fastening the metal skin to the transverse members and then expanding the expansion devices of the longitudinal members in each bay separately, thereby giving the metal skin in each bay the desired tension to make it capable of resisting the shear and bending forces set up in the hull structure.

8. The method of constructing a metal-covered rigid airship consisting substantially of transverse main frames, intermediate frames, longitudinal members provided with expansion devices in each bay and of a gas-tight metal skin, by first locating the transverse members in proper relative position, spacing and fixing said transverse members by the longitudinal members, applying and fastening the metal skin to the transverse members and then expanding the expansion devices of the longitudinal members in each bay separately, thereby giving the metal skin in each bay the desired tension to make it capable of resisting the shear and bending forces set up in the hull structure, and finally closing the gap at the expansion joints by structural material to permit removal of the expansion devices if desired.

9. The method of constructing a metal-covered rigid airship consisting substantially of transverse main frames, intermediate frames, an axial longitudinal member provided with expansion means and connecting the bow and the stern of the airship, and of a gas-tight metal skin, by first locating the transverse members in proper relative position and in relation to the axial longitudinal member, applying the metal skin over the transverse members and similarly fastening it to the bow and stern end of the longitudinal, expanding the expansion means of the longitudinal, thereby stretching the entire metal cover to about one-half of its yield strength, and then fastening it to the transverse frames to make it capable of resisting the shear and bending forces set up in the hull structure.

10. The method of constructing a metal-covered rigid airship consisting substantially of transverse main frames, longitudinal members provided with expansion means, and of a gas-tight metal skin, by applying the skin in prepared strips having a width substantially equal to the distance of two adjacent rings, and a length substantially equal to the circumference of the rings to which they are attached from a suspended drum which is rolled around the ship as successive portions are fastened in place, expanding the expansion means of the longitudinals and thereby stretching the skin to about one-half of its yield strength to make it capable of resisting the shear and bending forces set up in the hull structure.

11. The method of making metal-covered ships comprising the steps of winding a metal strip on a drum, supporting said drum above a ship, attaching an end portion of said strips to said ship, and rolling the drum about the ship's surface as successive portions of the strip are attached to the ship.

12. In a rigid metal-covered airship, a gas-tight metal hull, bulkhead walls dividing the hull into separate gas containers, some without diaphragms and some of which are provided with a diaphragm, the containers without diaphragms being fully inflated and the containers with a diaphragm being partially inflated, valves controlling the gas flow between a gas container without a diaphragm and a gas container with a diaphragm to keep the container without a diaphragm always fully inflated.

13. In a rigid metal-covered airship a gas-tight metal hull, bulk-head walls dividing the hull into separate gas containers, half of which are without diaphragms and half of which are provided with diaphragms, the containers without diaphragms being fully inflated and the containers with a diaphragm being partially inflated, valves controlling the gas flow between a gas container without a diaphragm and a gas container with a diaphragm to keep the container without a diaphragm always fully inflated.

14. In a rigid metal-covered airship, gas-tight metal-skin bulkhead walls dividing the hull into separate gas containers, some being without diaphragms and some provided with diaphragms, the containers without diaphragms being fully inflated and the containers with diaphragms being partially inflated, over-pressure safety valves in the container with a diaphragm, valves controlling the gas flow between a gas container without a diaphragm and a gas container provided with a diaphragm to keep the container without a diaphragm always fully inflated.

15. In an airship the combination with a hull having a metal exterior, one or more flexible partition walls dividing the interior of said hull into gas cells arranged longitudinally of the hull, the partition walls being sealed at least in part peripherally to the metal hull, there being but one partition wall between each cell, one or more bulkheads arranged transversely of said hull with one bulkhead adjacent each partition wall, and means for securing said partition wall to said bulkhead, whereby flexing of the partition wall due to unequal pressures in adjacent cells will be resisted by the bulkheads to relieve the stress on the partition walls.

16. In an airship the combination with a metal-covered hull of a bulkhead comprising bracing wires extending transversely of the hull and a flexible partition wall secured to said bulkhead for dividing said hull into a plurality of gas cells, each partition wall forming a wall of adjacent cells.

17. In an airship the combination with a metal-covered hull of transverse bulkheads formed of wire bracing extending transversely of said hull, gas cells arranged longitudinally of said hull and formed in part by the outer surface of said hull and in part by flexible partition walls transversely of the hull, the partition walls being secured to said bulkheads whereby the bulkheads take up some of the stress imparted to the partition walls by differential pressures on the opposite sides of the cell walls.

18. In an airship the combination with a metal-covered hull of partition walls arranged interiorly of said hull and having portions of their peripheral edges in sealing engagement with the metal cover for said hull, the remaining edges of the partition walls being connected by loose diaphragms which permit varying the capacity of said cells, bulkheads arranged transversely of said hull adjacent said partition walls and means for securing said partition walls to the bulkheads whereby the bulkheads take up part of the strain placed on the partition walls when there is a difference of pressure on the opposite sides thereof.

19. In an airship the combination with an annular frame forming a part of the hull of said airship, radial wires extending inwardly from said frame toward the center, at least some of said wires extending from substantially opposite sides of said ring, and having branch extensions at the center extending outwardly away from each other and axially of the frame, and a compressible member arranged between said branches and connected thereto, whereby upon radial tension being applied to any of said wires the branch connections move toward each other and cause compression of said compressible member, whereby to relieve the stress in the radial wires which would occur without the use of said resilient compressible member.

20. In an airship the combination with a substantially annular frame, telescoping cylinders arranged substantially centrally of said frame and axially thereof, pairs of wires connected to each other and to the opposite ends of said telescoping members, at least some of said wires extending from substantially opposite sides of said ring and bracing wires connected to said frame and to at least one pair of said wires, compressible means associated with said telescoping cylinders whereby when increased tension occurs in said bracing wires the pairs of wires will contract said telescoping cylinders and compress the compressible means associated therewith.

21. In an airship the combination with a substantially annular frame, telescoping cylinders arranged substantially centrally of said frame and axially thereof, pairs of wires connected to each other and to the opposite ends of said telescoping members, at least some of said wires extending from substantially opposite sides of said ring and bracing wires connected to said frame and to at least one pair of said wires, compressible means associated with said telescoping cylinders whereby when increased tension occurs in said bracing wires the pairs of wires will contract said telescoping cylinders and compress the compressible means associated therewith, said compressible means comprising a fluid.

22. In a rigid metal-covered airship, the combination with transverse main frames of longitudinal members spacing and connecting said frames, a bulkhead in each of said main frames comprising a plurality of wires, a fastening wire stretched across the lower half of each bulkhead between two longitudinal members and fastened to the bulkhead wires at the intersections therewith, a gas-tight flexible partition wall attached to each bulkhead and extending from the respective cross wires of that bulkhead upwardly against the metal skin and sealed thereto, said metal skin forming, together with the adjacent partition walls, the upper portions of a plurality of gas compartments, and a loose gas-tight flexible diaphragm extending below said upper portion of each of said gas compartments to form the lower portion of said gas compartments, said diaphragms being in sealed relation to said partitions and, due to their looseness, permitting change in the volume of said gas cells.

23. In a rigid metal-covered airship, the combination with transverse main frames of longitudinal members spacing and connecting said frames, a bulkhead arranged transversely in each of said main frames, a fastening wire stretched across the lower half of each bulkhead between two longitudinal members and connected to said bulkhead at least at a plurality of points, two gas-tight flexible walls, one of which is attached to one side and the other to the other side of the bulkhead and extending from the cross wire upwardly into sealing engagement with the metal cover of said ship, with which they form walls of adjacent gas containers on opposite sides of said bulkhead, additional similarly arranged flexible walls arranged in substantially parallel axially spaced relation with each of said first-mentioned flexible walls and sealed to the metal skin forming the cover of said ship, and loose, flexible diaphragms connected in sealing relation with the lower edges of said partition walls to complete the gas containers, the diaphragm being also connected along the inner edge of the longitudinal members.

24. In a rigid metal-covered airship, wire-braced transverse main frames and wire-braced intermediate frames, longitudinal keel members spacing and connecting said frames, cross wires stretching between two of the keel members in the lower half of the main frames and intermediate frames being fastened to the wire bracings, gas-tight flexible partition walls attached to the wire bracing of the main frames and extending upwardly from the cross wires to the sheet-metal skin to which they are sealed, forming together with the skin the upper portion of a lifting-gas compartment, and gas-tight flexible diaphragms between the wire bracings of the transverse frames sealed to the partition walls and to each other adjacent the cross wires and along the longitudinals to form the lower portion of a lifting-gas container, the diaphragm being loose to form an expansible compartment for the gas.

25. In a rigid metal-covered airship, radially wire-braced main frames and intermediate frames partially radially wire-braced and partially chord-wire braced, leaving an opening for accommodating a diaphragm in full width between main frames, longitudinal keel girders spacing and connecting said main frames, cross wires stretching between two of the keel girders in the lower half of the main frames and attached to the radial-wires bracing the main frames, gas-tight flexible partition walls fastened to the wire bracing of the main rings and extending upwardly from the cross wire to the metal skin to which they are sealed to form the upper part of a lifting gas compartment, a gas-tight flexible diaphragm sealed to the partition walls adjacent the cross wires and to keel members to form the lower portion of the lifting gas container, the diaphragm being provided with cutouts for accommodating the chord wires at full inflation.

26. In an airship a transverse main frame consisting of a substantially annular rigid outer circumferential girder and a substantially radially extending truss structure inside of and pivotally connected to said girder for bracing said girder radially throughout its entire periphery, and a flexible bulkhead connected to the inner edges of said truss structure.

27. In an airship the combination with a substantially annular frame of relatively small cross-section, radial members pivoted to said annular frame and extending inwardly of said frame, and tension members connecting said radial members to form a truss structure which will resist bending forces applied to said main frame in a substantially radial direction.

28. In an airship the combination with a substantially annular frame of relatively small cross-section, of a plurality of members pivoted to the inner side of said frame, means connecting the inner frame edges of said pivoted members and cross-bracing elements between said pivoted members to form a truss structure for bracing said frame against radial forces acting thereon.

29. In a rigid metal-covered airship mechanical means embedded in said ship for stretching the metal skin in a direction substantially perpendicular to a normal to said skin thereof to tension same, whereby to make it capable of resisting shear and bending forces irrespective of the inner pressure.

30. In an airship, a transverse main frame, a flexible bulkhead bracing said main frame comprising substantially radially extending wires, at least some of which are attached to and extend inwardly from opposite sides of said frame, a telescoping resilient device disposed substantially centrally of said bulkhead and resiliently expansible and contractible in a direction substantially perpendicular to the plane of said bulkhead, and having connections between its ends to the wires of said bulkhead, thereby permitting uniform expansion and contraction of said bulkhead when the lateral pressure on the bulkhead varies.

31. In an airship a transverse main frame, a flexible bulkhead bracing said main frame consisting of radial wires, at least some of which extend from opposite sides of said main frame, a telescoping pneumatic resilient device expansible and contractible in a direction axially of said bulkhead and conical spiders connected at their inner ends to said resilient device at opposite ends thereof and to said wires at the inner ends thereof for tensioning said wires resiliently, at least some of said wires extending inwardly from the opposite sides of said frame.

32. In an airship the combination with a frame, of an elongated, relatively thin metal hull, expansible tensioning means forming part of the frame extending longitudinally of the hull for tensioning the metal of said hull longitudinally thereof by expanding the frame longitudinally, and means for resisting any substantial contraction of the metal hull transversely thereof.

33. In an airship the combination with a frame of an elongated relatively thin metal hull, expansible tensioning means forming part of said frame, extending longitudinally of the hull for tensioning the metal of said hull longitudinally thereof by expanding the frame longitudinally, and means for resisting any substantial contraction of the metal hull transversely thereof, said expansible tensioning means comprising extensible longitudinal members forming part of the frame supporting said hull.

34. The method of constructing a metal-covered airship having a frame and a hull, which comprises the steps of forming the frame, attaching a thin metal cover to said frame to form the hull, mechanically stretching the cover taut over said frame to tension the metal cover in a direction longitudinally thereof after the cover is applied to said frame by mechanically enlarging said frame and thereafter mechanically maintaining said metal cover in said stretched condition under appreciable tension.

35. The method of constructing a metal-covered airship having a frame and a hull, which comprises the steps of forming the frame, attaching a thin metal cover to said frame to form the hull, mechanically stretching the cover taut over said frame to tension the metal cover after the cover is applied to said frame by mechanically enlarging said frame, and thereafter mechanically maintaining said metal cover in said stretched condition under appreciable tension.

36. In an airship the combination with a frame having means for mechanically expanding it in at least one direction, of a relatively thin metal hull secured to said frame and tensioned by said mechanical expanding means after the hull has been attached to said frame.

LLOYD H. DONNELL.